US011084235B2

(12) United States Patent
Gorham

(10) Patent No.: US 11,084,235 B2
(45) Date of Patent: Aug. 10, 2021

(54) SYSTEM, MOLD AND METHOD FOR FORMING AN OPHTHALMIC LENS

(71) Applicant: Gentex Optics, Inc., Dudley, MA (US)

(72) Inventor: Melvin Gorham, Bolton, MA (US)

(73) Assignee: Gentex Optics, Inc., Dudley, MA (US)

( * ) Notice: Subject to any disclaimer, the term of this patent is extended or adjusted under 35 U.S.C. 154(b) by 243 days.

(21) Appl. No.: 15/749,413

(22) PCT Filed: Dec. 15, 2015

(86) PCT No.: PCT/US2015/065863
§ 371 (c)(1),
(2) Date: Jan. 31, 2018

(87) PCT Pub. No.: WO2017/023351
PCT Pub. Date: Feb. 9, 2017

(65) Prior Publication Data
US 2018/0215112 A1 Aug. 2, 2018

Related U.S. Application Data

(60) Provisional application No. 62/199,887, filed on Jul. 31, 2015.

(51) Int. Cl.
*B29D 11/00* (2006.01)
*B29C 45/27* (2006.01)
(Continued)

(52) U.S. Cl.
CPC .... *B29D 11/00538* (2013.01); *B29C 45/2711* (2013.01); *B29D 11/00432* (2013.01);
(Continued)

(58) Field of Classification Search
CPC ........ B29D 11/00538; B29D 11/00432; B29C 45/2711
See application file for complete search history.

(56) References Cited

U.S. PATENT DOCUMENTS

| 4,252,294 A | 2/1981 | Uchio | |
|---|---|---|---|
| 5,554,395 A * | 9/1996 | Hume | B29C 45/27 264/328.15 |
| 2010/0002315 A1* | 1/2010 | Kuwa | B29D 11/00432 359/811 |

FOREIGN PATENT DOCUMENTS

| CN | 103906617 A | 7/2014 |
|---|---|---|
| EP | 0244783 A2 | 11/1987 |

(Continued)

OTHER PUBLICATIONS

International Search Report and Written Opinion issued in International Application No. PCT/2015/065863; dated Mar. 9, 2016.

(Continued)

*Primary Examiner* — Mathieu D Vargot
(74) *Attorney, Agent, or Firm* — Oblon, McClelland, Maier & Neustadt, L.L.P.

(57) ABSTRACT

The disclosed embodiments include a system, apparatus and method for forming an ophthalmic lens having reduced risk of optical defects. An illustrative injection molding system includes a heated sprue and a hot runner fluidly coupled to the heated sprue. The system also includes a mold fluidly coupled to the heated runner to receive a molten material. The mold includes a material conduit, which may be included in an interchangeable gate insert, and a lens cavity. The hot runner forms a material conduit having an inlet for receiving material from the hot runner and an outlet for delivering material to the lens cavity. The material conduit also includes a branch cavity disposed between the inlet and the outlet for receiving a diverted volume of degraded lens material.

9 Claims, 3 Drawing Sheets

(51) Int. Cl.
 *B29L 11/00* (2006.01)
 *B29C 45/00* (2006.01)
(52) U.S. Cl.
 CPC .............. *B29C 2045/0041* (2013.01); *B29L 2011/0016* (2013.01)

(56) References Cited

FOREIGN PATENT DOCUMENTS

| | | |
|---|---|---|
| EP | 1568474 A1 | 8/2005 |
| JP | 8-323817 A | 12/1996 |
| JP | 2004322584 A | 11/2004 |

OTHER PUBLICATIONS

Combined Office Action and Search Report dated Jun. 6, 2019 in Chinese Patent Application No. 201580082033.8, citing documents AO and AP therein, 17 pages (with English translation and English translation of categories of cited documents).

Combined Chinese Office Action and Search Report dated Dec. 2, 2019, in Patent Application No. 201580082033.8, citing documents AX-AZ therein, 20 pages (with English translation and English Translation of Category of Cited Documents).

Tian, C. et al., "Atlas of Plastic Injection Forming Mold Structure Designs", Light Industry Press, Jul. 1988, Figs.2-6(f), p. 23.

Zhong, Z. et al., the revised edition of "Plastic Injection Molding technology", Guangdong Science and Technology Press, Mar. 2001, pp. 282-283.

Wang, Y. et al "Modern Molding and Forming Handbook", Shanghai Jiaotong University Press, Apr. 1993, pp. 477-478.

\* cited by examiner

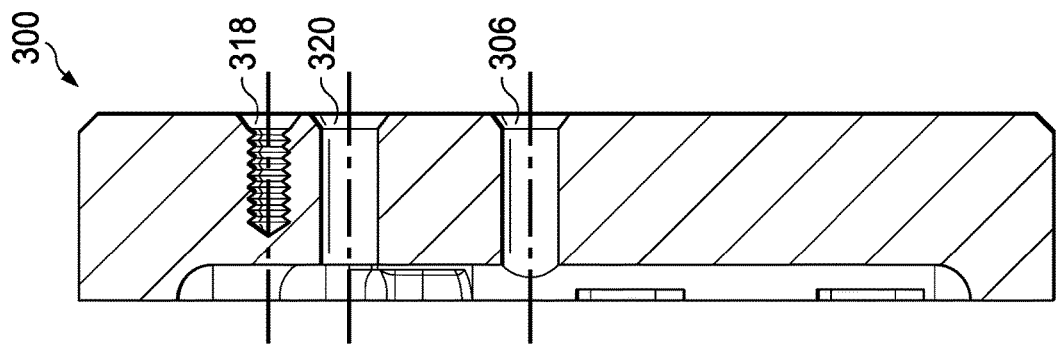
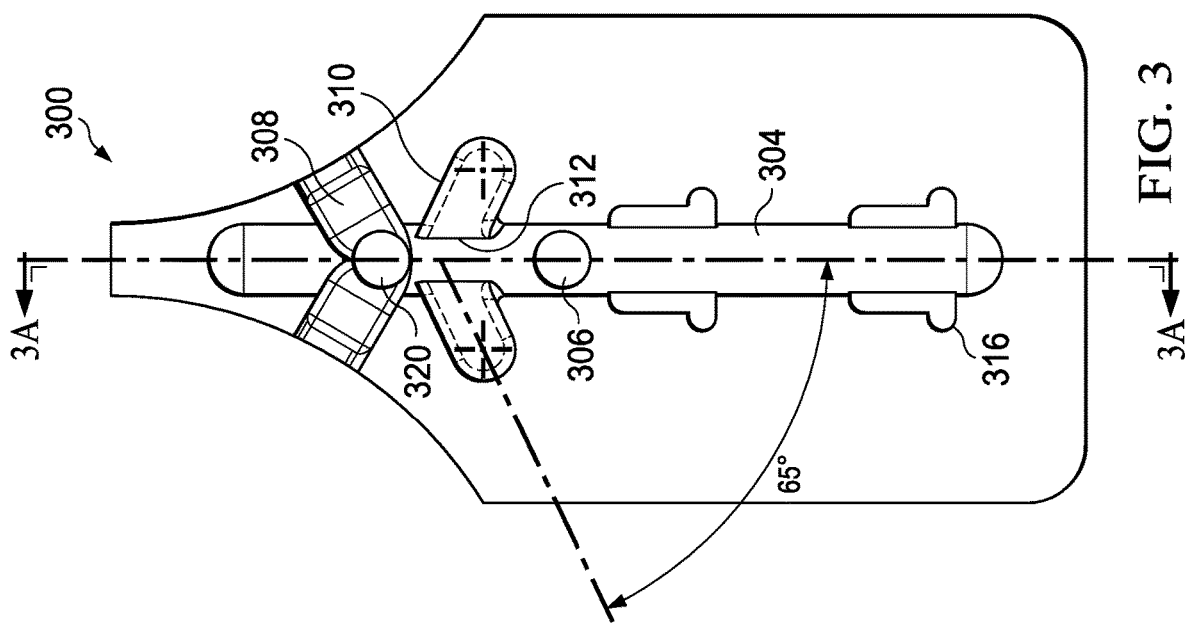

SYSTEM, MOLD AND METHOD FOR FORMING AN OPHTHALMIC LENS

TECHNICAL FIELD

The present disclosure relates generally to systems and methods for the injection molding of ophthalmic lenses.

BACKGROUND

Ophthalmic lenses for use in, for example, eye glasses, may be formed using an injection molding manufacturing process. The process includes injecting material into a mold, and can be performed with a host of materials, including metals, glass, elastomers, thermoplastic and thermosetting polymers, and mixtures thereof.

The process typically involves using a ram or screw-type plunger to force molten polymer material into a mold or part cavity where the material solidifies into the shape of the mold to form a molded part. The material may be injected at a high pressure to ensure the polymer takes the shape of the desired part, which may be, for example, an ophthalmic lens.

Molds can include a single part cavity or multiple part cavities. In multiple cavity molds, each cavity can be identical and form the same parts or can be unique and form multiple parts having different geometries during a single cycle. Molds are generally made from tool steels, but stainless steel and aluminum molds are suitable for certain applications.

When thermoplastics are molded in an injection molding process, pelletized raw material is typically fed through a hopper into a heated barrel with a reciprocating screw. Upon entrance to the barrel, the material is heated, causing the Van de Waals forces that resist relative flow of individual polymer chains to weaken as a result of increased space between molecules at higher thermal energy states. This reduces the polymer's viscosity, facilitating flow of the polymer material into the mold.

The reciprocating screw forces the polymer material forward, and mixes and homogenizes thermal and viscous distributions of the polymer. This mixing reduces heating time by mechanically shearing the material and adding a significant amount of frictional heating to the polymer. The now molten material feeds forward through a check valve and collects at the front of the screw into a volume known as a shot. A shot is the volume of material that is used to fill the mold cavity, compensate for shrinkage, and provide a cushion to ensure the transfer pressure from the screw to the mold cavity. The cushion may be approximately ten percent of the total shot volume, or a suitable amount of material to remain in the barrel and prevent the screw from bottoming out when the remainder of the shot volume is pressurized into the mold.

When enough material has gathered about the reciprocating screw, the material is forced at high pressure and a desired velocity into the part forming cavity. To prevent spikes in pressure, the process is generally a two-phase process wherein the screw controls material flow rate, or velocity, during the first phase until the cavity is 95-98% full (the transfer position). Injection times are often well under 1 second, but the injection process may be as slow as 30-50 seconds, or slower.

Next, during the second phase, which starts when the screw reaches the transfer position, the screw operation shifts to regulating pressure in the mold. During this phase, the packing pressure is applied to force material into the mold, and the mold completes filling and compensates for any thermal shrinkage of material in the cavity. Shrinkage may be relatively high for thermoplastics as compared to other materials. To offset the packing pressure, the mold may also include a press that provides sufficient pressure to keep the mold closed during the injection process.

The packing pressure is applied until material at the entrance to the cavity, which may be referred to as a gate, solidifies. The gate volume is typically small relative to the cavity volume, and the material in the gate is therefore normally the first place that material in the mold solidifies through its entire thickness.

Once the gate volume solidifies, no more material can enter the cavity, and the screw reciprocates and acquires material for the next cycle. Contemporaneously, material within the mold cools so that it can be dimensionally stable when ejected from the cavity. This cooling duration may be dramatically reduced by the use of cooling lines circulating water or oil from, for example, a thermolator.

Once the desired temperature has been achieved after cooling, the mold opens and an array of pins, sleeves, strippers, or similar mechanisms are driven forward to eject the article. Then, the mold closes and the process is repeated.

SUMMARY

In accordance with an illustrative embodiment, an ophthalmic lens mold includes a lens cavity for forming an ophthalmic lens and material conduit. The material conduit includes an inlet and an outlet. The outlet is fluidly coupled to the lens cavity and the inlet is fluidly coupled to a material source. The material conduit includes at least one branch cavity disposed between the inlet and the outlet.

In accordance with another illustrative embodiment, an illustrative injection molding system includes a heated sprue and a hot runner fluidly coupled to the heated sprue. The system also includes a mold fluidly coupled to the heated runner to receive a molten material. The mold includes a lens cavity for receiving a molten material that solidifies to form an ophthalmic lens. The hot runner forms a material conduit comprising an inlet for receiving material from the heated sprue and an outlet for delivering the material to the lens cavity. The material conduit includes a branch cavity disposed between the inlet and the outlet for receiving a diverted volume of degraded lens material.

In accordance with another illustrative embodiment, an illustrative method of forming an ophthalmic lens includes heating a lens material to form a molten lens material and delivering the molten lens material to a material conduit. The material conduit includes an inlet and an outlet. The method also includes flowing the molten lens material through the material conduit toward a lens cavity that defines a lens. In addition, the method includes diverting a first volume of degraded molten lens material into at least one branch cavity disposed between the inlet and the outlet of the material conduit, and flowing a second volume of molten lens material through the outlet to the lens cavity.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing figures, which are incorporated by reference herein, and wherein:

FIG. 3 is a schematic, top view, of a gate insert having a plurality of branch cavities; and FIG. 3A is a schematic, top view, of a gate insert having a plurality of branch cavities.

Figure 1:
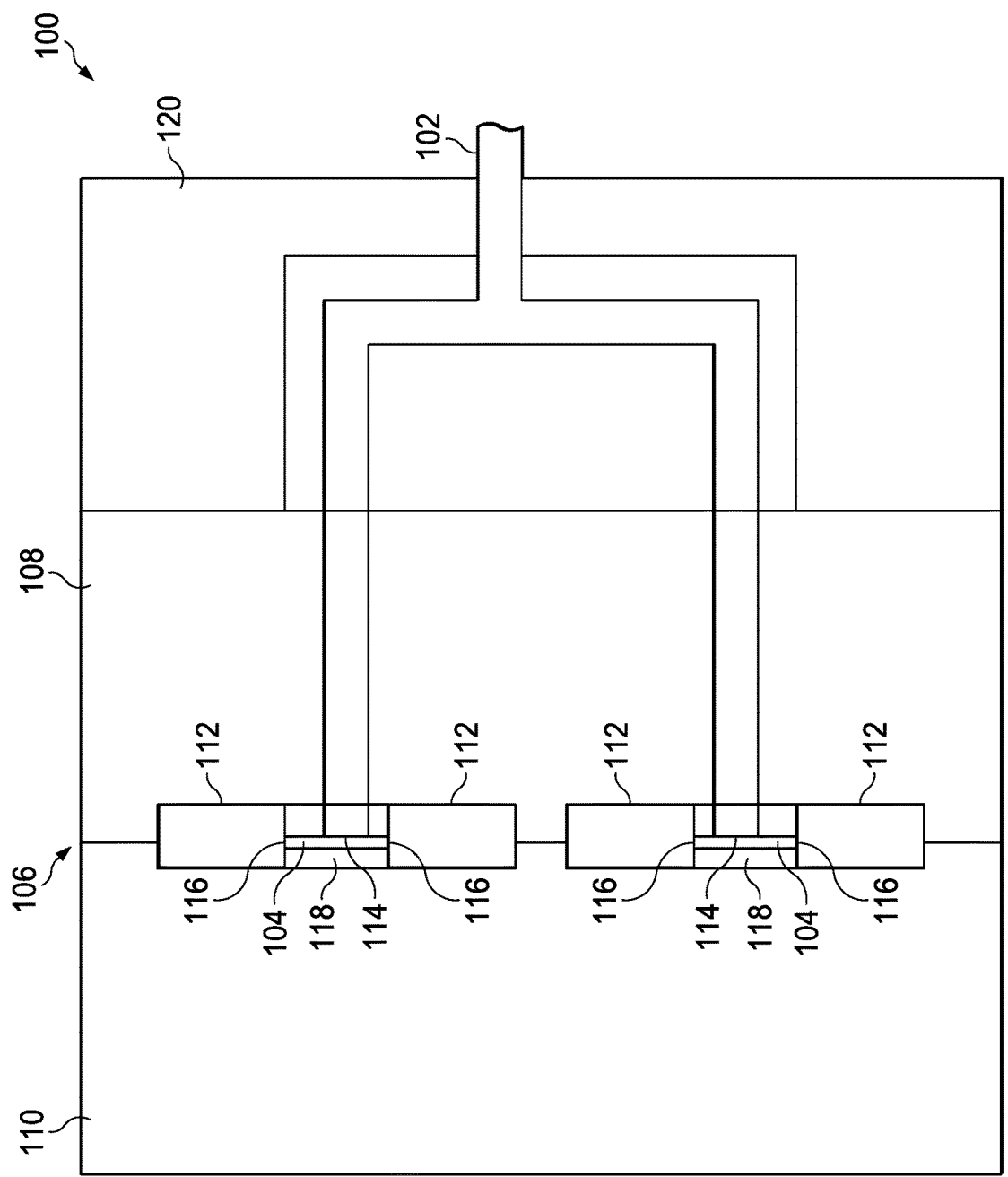
FIG. 1 is a schematic, cross-section view of an injection molding system for manufacturing ophthalmic lenses.

The illustrated figures are only exemplary and are not intended to assert or imply any limitation with regard to the environment, architecture, design, or process in which different embodiments may be implemented.

DETAILED DESCRIPTION

The present disclosure relates to an injection molding system that produces parts with improved optical clarity. The system includes a molding machine having a material hopper, a screw-type plunger, and a heating unit for delivering molten material to a mold. In the case of an ophthalmic lens, the material may be a polycarbonate, or any other suitable material.

In the molding process, granular material, which may be a thermoplastic polymer, is fed by gravity from a hopper into a heated barrel. As the granules are slowly moved toward the mold by a screw-type plunger, as described above, the polymer is forced into a heated chamber, where it is melted. As the plunger advances, the melted material is forced through a nozzle that rests against the mold, allowing the material to enter the part cavity through a gate and runner system. The mold is generally at a lower temperature than the melted polymer so the polymer starts to solidify as soon as the mold is filled.

In a hot runner system, however, the mold system includes an assembly of heated components used in polymeric injection molds. As such, a hot runner mold can be thought of as an extension of the heated barrel where the material can be kept at a molten state inside the mold. Some hot runner systems can keep the polymer molten up to the point of the part being molded, and some use a combination hot runner and cold runner. As referenced herein, the "runner" may refer to the portion of a mold that operates as a material conduit for transferring molten material from a mold inlet to a part cavity.

In certain hot runner systems, material that first enters the mold may be optically degraded. For example, material that first enters the mold may become discolored, rendering the material unsuitable for use in an optical part, such as a lens. The degradation may be visually observed in the form of a brown line in the molded part, and may be referred to as a "brown swirl" defect. The present disclosure provides a solution for preventing the degraded material from being used in a molded optical part such that lenses formed using the hot runner molding system described herein do not include the aforementioned brown swirl defect.

A noted benefit of a hot runner system is that the material in the mold system's runner and sprue are kept in a molten state, which saves material and improves processing capabilities versus a cold runner mold. In an embodiment, a cold runner feed design may be used in connection with a hot runner system. In such an embodiment, the cold runner is formed integrally to the mold tooling, and the runner feed design has branch circuits that allow a flow path for degraded material. This design directs degraded material away from the part cavity and into the branch circuits, thereby preventing the degraded material from entering the part cavities, and in turn preventing the degraded material from being incorporated into the finished part.

Turning now to the figures, an illustrative system is shown in FIG. 1. FIG. 1 depicts an injection molding system 100 having a heated sprue 102 and a heated runner 104 fluidly coupled to the heated sprue 102. The heated sprue 102 forms a material flow path that flows through a heated portion 120 of the mold system 100. The system also includes a two-part mold 106 having a first portion 108 and a second portion 110. The mold 106 is fluidly coupled to the heated runner 104 to receive a molten material. Voids in the first portion 108 and second portion 110 define a lens cavity 112. In an embodiment, the heated runner 104 forms a material conduit having an inlet 114 for receiving material from the heated runner 104 and an outlet 116 for delivering material to the lens cavity 112 and a branch cavity (described with regard to FIG. 2) disposed between the inlet 114 and the outlet 116. In an embodiment, the first portion 108 of the mold 106 is analogous to the mold described with regard to FIG. 2, and the second portion 108 is a mating portion that does not include an inlet for receiving material but forms an opposing, complementary portion of the mold.

In an embodiment, the system includes a gate insert 118 disposed between the lens cavity 112, and the hot runner 104 is positioned within the gate insert 118. In such an embodiment, the gate insert 118 may include a branch cavity, as described in more detail with regard to FIGS. 2 and 3. The branch cavity may be formed integrally to the mold or included in a gate insert that is assembled with the mold to transport material from a material inlet toward a part cavity when the mold is used.

In an embodiment, the material conduit inlet forms a cold runner portion that includes the branch conduit. The material conduit provides a fluid flow path so that molten material entering the material conduit is first directed into the branch conduit(s). This first portion of material may correspond to a predetermined volume of degraded material. The degraded material is diverted into the branch cavities where it reaches a dead end. The subsequently provided material travels into the part cavity as "fountain flow".

The mold 106 may include a plurality of lens cavities 112 for forming ophthalmic lenses. In such an embodiment, the mold 106 may a plurality of branch cavities, each of which may have a branch cavity inlet positioned at an angle of between 15 and 85 degrees from a longitudinal axis of the material conduit.

Figure 2:
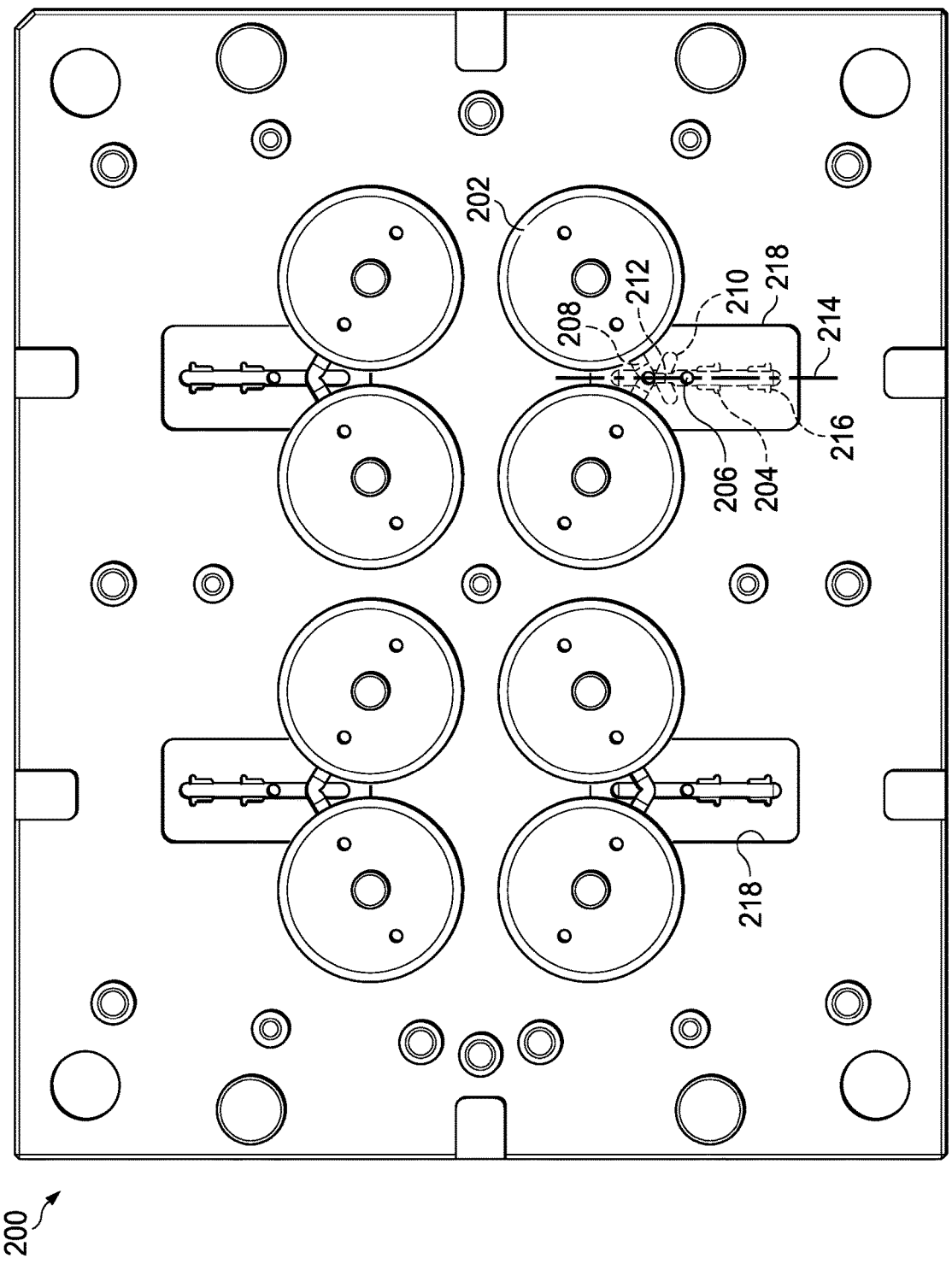
FIG. 2 is a schematic, cross-section view of a mold having a plurality of lens cavities and gate inserts.

Turning now to FIG. 2, in accordance with an illustrative embodiment, an ophthalmic lens mold 200 includes a lens cavity 202 for forming an ophthalmic lens. The lens mold 200 also includes a material conduit 204 comprising an inlet 206 and an outlet 208. The outlet 208 is fluidly coupled to the lens cavity 202 and the inlet 206 is fluidly coupled to a material source. In some embodiments, the material conduit 204 includes at least one branch cavity 210 disposed between the inlet 206 and the outlet 208.

In an embodiment, the material conduit 204 is formed by a cylindrical portion between the inlet 206 and the outlet 208, and the branch cavity 210 is fluidly coupled to the material conduit 204 at the cylindrical portion. The branch cavity 210 has a branch inlet 212 having a diameter that is approximately equal to the diameter of the cylindrical portion of the material conduit 204 adjacent the branch cavity inlet 212. In other embodiments, however, the branch cavity 210 has a branch inlet 212 that has a diameter that is greater or less than the diameter of the cylindrical portion of the material conduit 204.

The material conduit 204 may further include a plurality of wing cavities 216, which, on a molded part, may form holders for subsequent processing of the molded part. For example, the holders formed by the wing cavities 216 may be used to hold a lens part during a subsequent coating process.

In an embodiment, the mold 200 includes a plurality of gate insert cutouts 218 for receiving one or more interchangeable gate inserts, such as gate insert 300, which is described below with regard to FIG. 3. Each gate insert may effectively act as a component of the mold 200 and may include a cavity in the shape of the material conduit and branch cavities 210.

It is noted that the ophthalmic lens mold 200 may include a plurality of lens cavities 202, and that the material conduit 204 may be fluidly coupled to a second branch cavity 210 or to a plurality of branch cavities 210. Each branch cavity 210 or pair of branch cavities 210 may be arranged symmetrically about a material conduit 204. The branch cavities 210 may be positioned at an angle of between 15 and 85 degrees from a longitudinal axis 214 of the cylindrical portion of the material conduit 204.

As noted above, in an embodiment, the branch cavities described above may be positioned within an interchangeable gate insert 300, that is inserted as a mold component to receive molten material from a heated sprue, or other material source, and to deliver the molten material to one or more lens cavities.

In the embodiment of FIGS. 3 & 3A, the gate insert 300 includes a material conduit 304 comprising an inlet 306 and an outlet 308. The outlet 308 is fluidly coupled to a lens cavity, such as the lens cavity 202 of FIG. 2, and the inlet 306 is fluidly coupled to a material source. In some embodiments, the material conduit 304 includes at least one branch cavity 310 disposed between the inlet 306 and the outlet 308. The material conduit 304 defines a cylindrical portion between the inlet 306 and the outlet 308, and the branch cavity 310 is fluidly coupled to the material conduit 304 at the cylindrical portion and may be spaced away from the inlet 306 by at least one diameter of the cylindrical portion. In an embodiment, the gate insert 300 further includes a threaded hole 318 for fastening the gate insert 300 relative to a mold, and a pin-hole 320 for receiving an ejector pin that may be used to eject a completed part from a mold after forming.

The material conduit may further include a plurality of wing cavities 316, which, on a molded part, may form holders for subsequent processing of the molded part. For example, the holders formed by the wing cavities 316 may be used to hold a lens part during a subsequent coating process. The holders may also provide an interface for automating equipment during other parts of the fabrication and finishing process, and may also be marked for part identification.

In an experimental embodiment, a mold, such as the mold 200 of FIG. 2, was operated with one gate insert 300 that included a branch cavity 310 and three alternative gate inserts that did not include the branch cavities 310. Testing was conducted and consisted of processing two lenses using the gate insert 300 having the branch cavities 310 and processing six lenses using the three alternative gate inserts that did not include branch cavities 310. All eight lenses were processed at the same time under identical conditions. Inspection results indicated that the two lenses molded with the gate insert 300 having the branch cavities 310 had no visual defects, while the remaining six lenses were found to have the brown swirl defect within the lenses.

In operation, the system described above may be used to form one or more molded ophthalmic lenses. An illustrative method of operation includes heating a lens material, such as a polycarbonate or other polymer, to form a molten lens material. The method also includes delivering the molten lens material to the material conduit described above with regard to the mold 200 and gate insert 300. The molten lens material is flowed through the material conduit toward a lens cavity that defines a lens. Prior to forming the lens, a first volume of molten lens material is diverted into at least one branch cavity disposed between the inlet and the outlet. Next, a second volume of molten lens material is flowed through the outlet to the lens cavity to form the lens.

The method may include flowing the molten lens material through a cylindrical portion of the material conduit, and it is noted that the first volume of molten material that is diverted into the at least one branch cavity includes a volume of degraded material. Similarly, flowing the second volume of molten lens material to the lens cavity comprises flowing molten lens material through the outlet to the lens cavity following the step of diverting a first volume of molten lens material into at least one branch cavity.

The diverted volume of material may be predetermined as a volume that is greater than the volume of material that is affected by the brown swirl defect. In an embodiment, the predetermined volume may be expressed as at least $2\pi r^3$, where r is the radius of the inlet and the predetermined volume is approximated as a cylindrical volume having a length equivalent to the diameter of the volume (such that length=$2*r$ and V (volume)=$2r*\pi^2=2\pi r^3$).

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Additionally, although specific terms are employed herein, they are used in a generic and descriptive sense only and not for purposes of limitation. Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

What is claimed is:
1. An ophthalmic lens mold comprising:
   a lens cavity for forming an ophthalmic lens; and
   a material conduit comprising an inlet and an outlet, the outlet being fluidly coupled to the lens cavity, and the inlet being fluidly coupled to a material source, the material conduit receiving lens material from the material source,
   wherein the material conduit comprises a cylindrical portion between the inlet and the outlet, wherein the material conduit comprises a plurality of branch cavities, disposed between the inlet and the outlet, each branch cavity being fluidly coupled to the material conduit at the cylindrical portion and receiving at least a portion of degraded lens material from the material source, wherein each branch cavity comprises a branch inlet receiving the at least a portion of the degraded lens material and diverting the received at least a portion of the degraded lens material to a dead end, and wherein each branch cavity is positioned at an angle of between 15 and 85 degrees from a longitudinal axis of the cylindrical portion of the material conduit.

2. The ophthalmic lens mold of claim 1, wherein the branch inlet has a diameter that is approximately equal to the diameter of the cylindrical portion of the material conduit.

3. The ophthalmic lens mold of claim 1, wherein the branch inlet has a diameter that is less than the diameter of the cylindrical portion of the material conduit.

4. A method of forming an ophthalmic lens, the method comprising:

heating a lens material to form a molten lens material;

delivering the molten lens material to a material conduit, the material conduit comprising:
an inlet and an outlet;
a cylindrical portion between the inlet and the outlet, and
a plurality of branch cavities, disposed between the inlet and the outlet, each branch cavity being positioned at an angle of between 15 and 85 degrees from a longitudinal axis of the cylindrical portion of the material conduit;

flowing the molten lens material through the cylindrical portion of the material conduit toward a lens cavity, the lens cavity defining a lens;

diverting a first volume of degraded molten lens material into a dead end of at least one branch cavity, each branch cavity being fluidly coupled to the material conduit at the cylindrical portion; and flowing a second volume of molten lens material through the outlet to the lens cavity, wherein flowing a second volume of molten lens material to the lens cavity comprises flowing molten lens material through the outlet to the lens cavity following the diverting a first volume of degraded molten lens material into at least one branch cavity.

5. The method of claim 4, wherein diverting a first volume of degraded molten lens material into at least one branch cavity disposed between the inlet and the outlet comprises diverting a volume of at least $2\pi r^3$, where r is the radius of the inlet.

6. An injection molding system comprising:

a heated sprue;

a hot runner, the hot runner being fluidly coupled to the heated sprue; and a mold fluidly coupled to the heated sprue to receive a molten material, the mold comprising the hot runner and a lens cavity, wherein the hot runner forms a material conduit comprising an inlet that receives material from the heated sprue, an outlet that delivers material to the lens cavity and a plurality of branch cavities disposed between the inlet and the outlet that receives a volume of degraded lens material from the heated sprue and diverts the received volume of degraded lens material to a dead end, and wherein the material conduit comprises a cylindrical portion between the inlet and the outlet, each branch cavity being fluidly coupled to the material conduit at the cylindrical portion and positioned at an angle of between 15 and 85 degrees from a longitudinal axis of the cylindrical portion of the material conduit.

7. The system of claim 6, further comprising a gate insert, wherein the hot runner is positioned within the gate insert and fluidly coupled to the lens cavity and the heated sprue, and wherein the hot runner includes each branch cavity.

8. The system of claim 6, wherein the branch cavity has a branch cavity inlet having an area cross-section that is greater than or equal to an area cross-section of the material conduit adjacent the branch cavity inlet.

9. The system of claim 6, wherein the mold is a tandem part mold for ophthalmic lenses.

* * * * *